US006473785B1

United States Patent
Mizuno et al.

(10) Patent No.: US 6,473,785 B1
(45) Date of Patent: *Oct. 29, 2002

(54) OPERATION RIGHT INTERLINKING METHOD AND COOPERATIVE WORKING METHOD FOR SHARED APPLICATION PROGRAMS

(75) Inventors: Hiromi Mizuno; Hideyuki Fukuoka, both of Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/283,762

(22) Filed: Apr. 2, 1999

Related U.S. Application Data

(63) Continuation of application No. 08/782,100, filed on Jan. 13, 1997, now Pat. No. 5,948,056.

(30) Foreign Application Priority Data

Jan. 12, 1996 (JP) ............................................. 8-21831

(51) Int. Cl.[7] ............................................. G06F 15/16
(52) U.S. Cl. ...................... 709/205; 709/204; 709/327; 709/328; 709/329
(58) Field of Search ................................. 709/205, 204, 709/327–329; 707/9

(56) References Cited

U.S. PATENT DOCUMENTS

| 5,195,086 A | | 3/1993 | Baumgartner et al. ...... 370/264 |
| 5,392,400 A | | 2/1995 | Berkowitz et al. ........... 709/203 |
| 5,414,856 A | | 5/1995 | Yakota ....................... 710/240 |
| 5,491,743 A | * | 2/1996 | Shiio et al. .................. 379/202 |
| 5,530,880 A | | 6/1996 | Katsurabayashi ............ 713/201 |
| 5,574,901 A | * | 11/1996 | Takahashi ...................... 707/1 |
| 5,652,866 A | | 7/1997 | Aldred et al. ................. 703/23 |
| 5,748,894 A | | 5/1998 | Ishizaki et al. ............. 709/202 |
| 5,799,191 A | * | 8/1998 | Moriyasu et al. ........... 709/302 |

FOREIGN PATENT DOCUMENTS

| JP | 6243071 | 9/1994 |
| JP | 764906 | 3/1995 |
| JP | 4122140 | 4/1998 |

OTHER PUBLICATIONS

Patent Abstracts of Japan, vol. 96, No. 11, Nov. 29, 1996.
HongHai Shen et al., "Access Control for Collaborative Environments", CWCW 92 Proceedings, Nov. 1992, pp. 51–58.
"Method for Automatic Execution of a Program upon Determination of a System Constraint Predicate", *IBM Technical Disclosure Bulletin*, vol. 36, No. 06A, Jun. 1993, p. 325.
"Mechanism to Identify the Resource Which a Shared Application Needs to Run on and OS/2 Server", *IBM Technical Disclosure Bulletin*, vol. 34, No. 10A, Mar. 1992, p. 95.

* cited by examiner

Primary Examiner—Arry D. Donaghue
Assistant Examiner—Nabil El-Hady
(74) Attorney, Agent, or Firm—Sughrue Mion, PLLC

(57) ABSTRACT

The invention provides an operation right interlinking method and a cooperative working method wherein, when a plurality of shared application programs operate cooperatively with each other to effect a cooperative work, operation rights of the shared application programs are always possessed by a same terminal so that a work can be performed efficiently without an inconsistency. To this end, the operation rights of the shared application programs are controlled in an interlinking relationship with each other. When a request for an operation right is issued to a first application program of a first terminal, the first application program requests a first application program of a second terminal for transmission of the operation right and sends an operation right change notification to a second application program of the first terminal whose operation right is to be interlinked with the first application program. Upon reception of the operation right change notification, the second application program of the first terminal requests a second application program of the second terminal based on the operation right change notification.

2 Claims, 17 Drawing Sheets

US 6,473,785 B1

OPERATION RIGHT INTERLINKING METHOD AND COOPERATIVE WORKING METHOD FOR SHARED APPLICATION PROGRAMS

This application is a continuation of U.S. patent application Ser. No. 08/782,100 filed Jan. 13, 1997, now U.S. Pat. No. 5,948,056 issued Sep. 7, 1999, the disclosure of which is hereby incorporated by reference for all purposes.

BACKGROUND OF THE INVENTION

1. Field of the Invention

This invention relates to transmission control of operation rights of shared application programs when a plurality of terminals sharing the application program perform a cooperative work.

2. Description of the Related Art

Conventionally, when a plurality of terminals connected to each other via a network, for example, as shown in FIG. 1, share application programs and cooperatively operate to perform a cooperative work between users of the terminals, in order to assure the consistency in operation and state, the application programs are individually provided with operation rights and exclusion control of operations by users of the terminals is effected using the operation rights.

An operation right is provided for each of application programs shared by a plurality of terminals, and is transmitted in accordance with an operation of a user to effect a work. For example, in the system shown in FIG. 1, for a shared application program A, only one of application programs A 11, 21, . . . , n1 has an operation right at any point of time, and only a user of the application program which has the operation right can perform an operation of the application program A. However, if the operation right is transmitted, then only a user of the application program to which the operation right is transmitted can thereafter perform an operation.

For the transmission control of the operation right here, for example, such operation right transmission control methods as illustrated in FIGS. 15 and 16 are used.

In the conventional operation right transmission control method illustrated in FIG. 15, a user of an application program 24 who does not have an operation right requests the application program 24 for the operation right, and an operation right acquisition request is sent from the application program 24 which requests for the operation right to an application program 14 which currently has the operation right. Then, the application program 14 which has received the operation right acquisition request and has the operation right abandons the operation right and sends an operation right acquisition response to the application program 24 which has requested for the operation right. Consequently, the operation right is transmitted to the application program 24 which has received the operation right acquisition response.

On the other hand, in the conventional operation right transmission control method illustrated in FIG. 16, an application program 14 which has an operation right designates another application program (in the case illustrated in FIG. 16, an application program 24) which is to subsequently acquire the operation right, and abandons the operation right and sends an operation right abandonment notification to the application program which is to subsequently acquire the operation right. Consequently, the operation right is transmitted to the application program which has received the operation right abandonment notification.

It is to be noted that, in both of the conventional operation right transmission control methods described above with reference to FIGS. 15 and 16, shared application programs are controlled individually, and even where a plurality of shared application programs are involved, transmission control of an operation right is performed independently among the individual shared application programs.

In this manner, in the conventional operation right transmission control methods described above, even where users effect a cooperative work using a plurality of application programs shared by them, the operation rights of the individual shared application programs are individually controlled by the respective shared application programs. Therefore, it sometimes occurs that the operation rights corresponding to the individual shared application programs are possessed by the application programs on different terminals from each other in such a manner that, as illustrated, for example, in FIG. 17, the operation right of a shared application program A is possessed by an application program A 11 on a terminal 1 while the operation right of another shared application program B is possessed by another application program B 22 on another terminal 2. In such an instance, different users operate the application programs, which may cause confusion in working.

SUMMARY OF THE INVENTION

It is an object of the present invention to provide an operation right interlinking method for shared application programs and a cooperative working method wherein, when a plurality of application programs are shared to effect a cooperative work, operation rights of the shared application programs are always possessed by a same terminal so that a work can be performed efficiently without an inconsistency.

In order to attain the object described above, according to the present invention, when a plurality of application programs are shared to effect a cooperative work, the operation rights of the shared application programs are controlled in an interlinking relationship with each other.

In particular, according to an aspect of the present invention, there is provided an operation right interlinking method for use when a plurality of shared application programs cooperatively operate between a plurality of terminals to effect a cooperative work, wherein each of the plurality of shared application programs has an operation right, and operation right transmission information of a first one of the shared application programs is reported to a second one of the shared application programs to control transmission of the operation right of the second shared application program so that the operation rights of the first application program and the second application program may be interlinked with each other.

According to another aspect of the present invention, there is provided a cooperative working method for shared application programs, comprising the steps of starting, on a plurality of terminals connected to each other via a network, a plurality of shared application programs which have individual operation rights having a high-low order relationship set therebetween and operate cooperatively with each other; and interlinking the operation right of a low-order one of the shared application programs with the operation right of a high-order one of the shared application programs in accordance with the operation right interlinking method as claimed in claim 1 to effect a cooperative work.

In the operation right interlinking method and the cooperative working method of the present invention, when a plurality of application programs are shared to effect a cooperative work, the operation rights of the different shared application programs are interlinked with each other so that the operation rights of the plurality of shared application programs may be present always on a same terminal to allow a single user to operate the plurality of shared application programs. Consequently, otherwise possible confusion in operation can be eliminated, and a work can be proceeded efficiency without any inconsistency.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Embodiment 1

Figure 1:
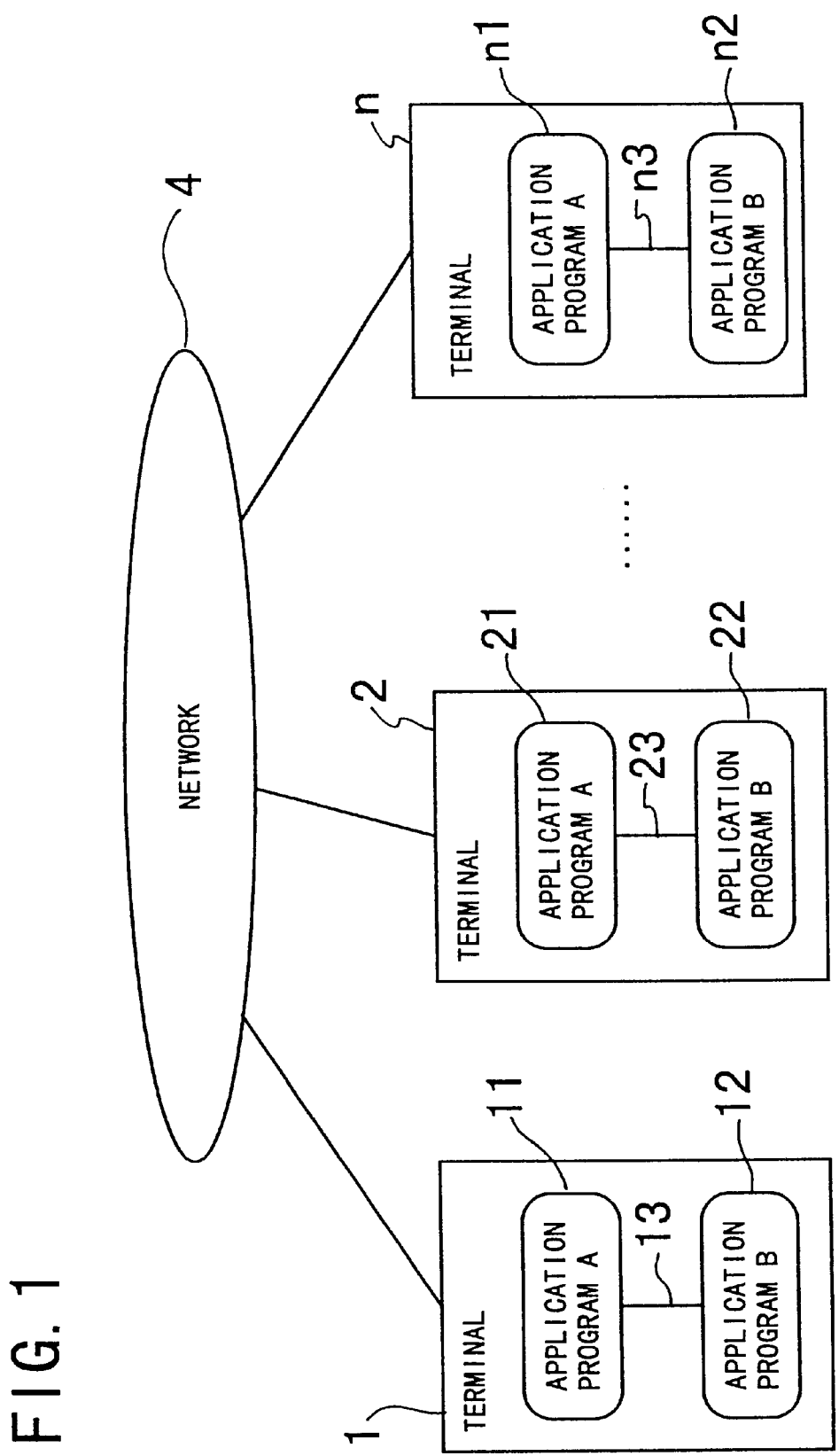
FIG. 1 is a block diagram showing a system on which an operation right interlinking method and a cooperative working method according to the present invention can be performed.

FIG. 1 shows a system on which an operation right interlinking method and a cooperative working method according to the present invention can be performed. Referring to FIG. 1, a plurality of terminals 1, 2, . . . , n are connected to each other via a network 4. The terminals 1, 2, . . . , n individually start application programs A and B to perform a cooperative work.

The terminals 1, 2, . . . , n may be personal computers, work stations or like units. Meanwhile, the network 4 may be any of various networks including the Ethernet, the ATM-LAN and public networks such as ISDN.

Each of the application programs A and B is shared application programs which cooperatively operate between a plurality of terminals and include such an operation right control method described hereinabove with reference to FIG. 15 or 16. Further, a communication line 13, 23, . . . , or n3 is provided between the application program A and the application program B on each same terminal.

Subsequently, processing of an operation right interlinking method according to a first preferred embodiment of the present invention will be described.

Figure 2:
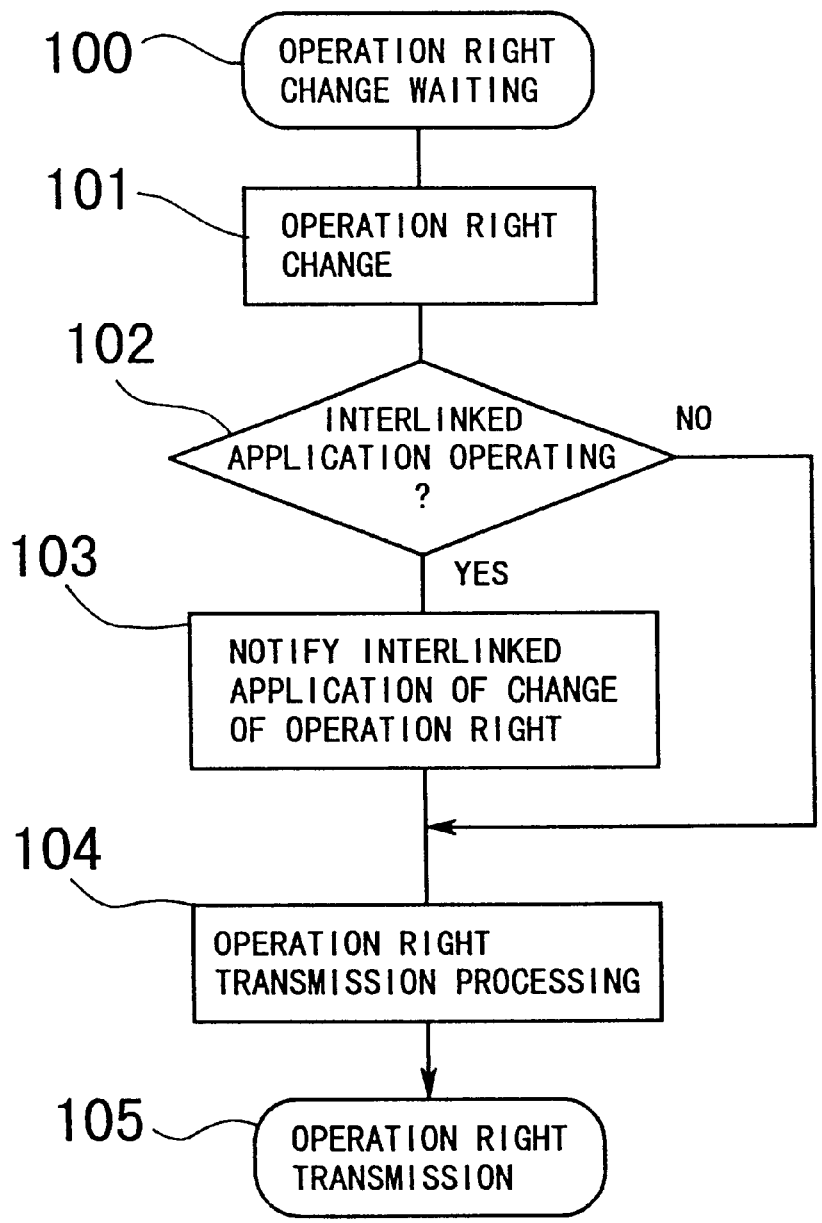
FIGS. 2 and 3 are flow charts illustrating procedures of operation of interlinking and interlinked application programs, respectively, in an operation right interlinking method according to a first preferred embodiment of the present invention.
Figure 3:
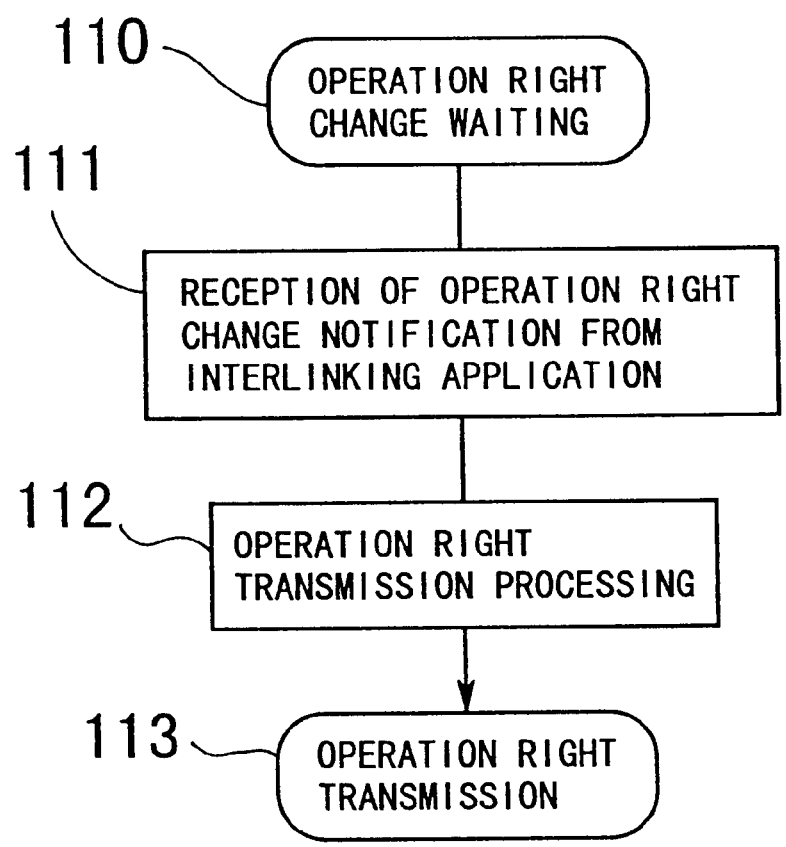

FIGS. 2 and 3 are flow charts illustrating different procedures of operation of the operation right interlinking method according to the first embodiment of the present invention, and illustrate flows of control of application programs on a terminal which issues an instruction for a change of an operation right. It is to be noted that the terminal which issues an instruction for a change of an operation right signifies, where the operation right transmission control method illustrated in FIG. 15 is adopted, the terminal 2 in which the application program 24 to which a request for the operation right is issued is present, but signifies, where the operation right transmission control method illustrated in FIG. 16 is adopted, the terminal 1 in which the application program 14 which possesses the operation right is present.

FIG. 2 illustrates a procedure of operation of an application program which causes interlinking from among a plurality of shared application programs on a same terminal.

Referring to FIG. 2, if an operation for changing an operation right is performed (step 101) after an application program which causes interlinking (such application program will be hereinafter referred to as interlinking application program) remains in an operation right change waiting state (step 100), then the interlinking application program confirms whether or not another application program which is interlinked or is to be interlinked (such application program will be hereinafter referred to as interlinked application program) is operating (step 102). Here, the operation for changing an operation right is performed, for example, by depression of a predetermined button on a user interface provided by the interlinking application program.

If it is confirmed in step 102 that the interlinked application program is operating (when the discrimination in step 102 is YES), then the interlinking application program sends an operation right change notification to the interlinked application program (step 103). On the other hand, when the interlinked application program is not operating (when the discrimination in step 102 is NO), the interlinking application program advances its processing to step 104 skipping step 103.

After the processing in step 103 is ended or the discrimination of NO is made in step 102, operation right transmission processing is performed (step 104) to transmit the operation right of the interlinking side application program (step 105). It is to be noted that, for the operation right transmission processing in step 104, any of various existing methods such as, for example, the existing operation right transmission control methods illustrated in FIGS. 15 and 16 may be adopted depending upon the application program.

FIG. 3 illustrates a procedure of operation of the interlinked application program from among the plurality of shared application programs present on the same terminal.

Referring to FIG. 3, if the interlinked application program receives an operation right change notification from the interlinking application program (step 111) after it remains in an operation right change waiting state (step 110), then the interlinked application program performs operation right transmission processing in response to the received operation right change notification (step 112) to transmit the operation right of the interlinked application program (step 113). It is to be noted that, for the operation right transmission processing in step 112, any of various existing methods may be adopted similarly as in step 104 shown in FIG. 2.

Embodiment 2

Figure 4:
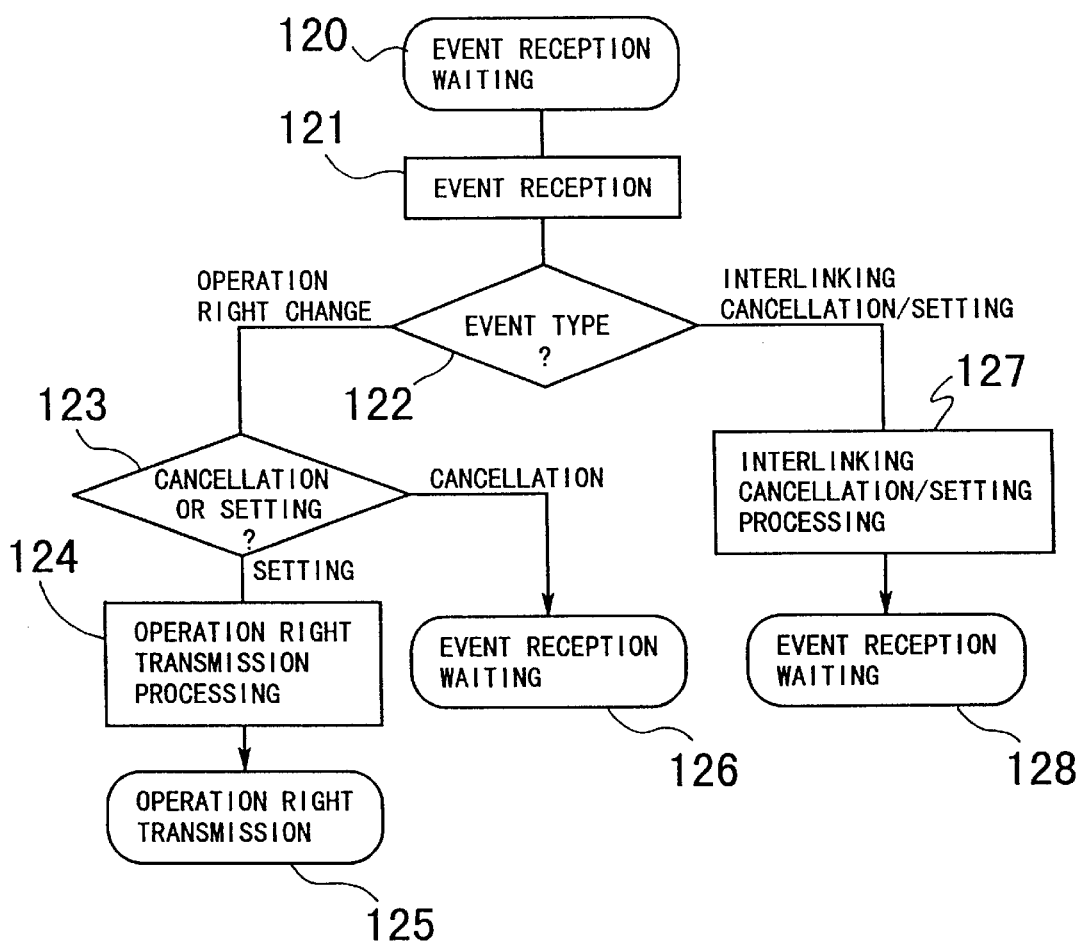
FIG. 4 is a flow chart illustrating a procedure of operation of an interlinked application program in an operation right interlinking method according to a second preferred embodiment of the present invention.

FIG. 4 is a flow chart illustrating a procedure of operation of an operation right interlinking method according to a second preferred embodiment of the present invention.

In the operation right interlinking method according to the present embodiment, the procedure of operation of the interlinking application program is similar to that illustrated in FIG. 2, and FIG. 4 illustrates only a procedure of operation of the interlinked application program.

Referring to FIG. 4, when the interlinked application program receives an operation event from a user of the application program or an event from another application program (step 121) after it remains in an event reception waiting state (step 120), it discriminates a type of the received event (step 122).

If it is discriminated in step 122 that the received event is an operation right change notification (refer to step 103 of FIG. 2) from the interlinking application program, then the interlinked application program confirms whether interlinking of the operation right is set or cancelled (step 123). If interlinking of the operation right is set, then the interlinked application program performs operation right transmission processing (step 124) to transmit the operation right of the interlinked application program (step 125). However, if interlinking of the operation right is cancelled in step 123, then the interlinked application program enters back into the event reception waiting state (step 126).

On the other hand, if it is discriminated in step 122 that the received event relates to cancellation or setting of interlinking of the operation right, then the interlinked application program performs processing for cancellation or setting of interlinking (step 127), and then enters back into the event reception waiting state (step 128). It is to be noted that, in the processing of cancellation or setting of interlinking in step 127, the interlinked application program performs management of a cancellation or setting state of interlinking in order to use it for discrimination in step 123, and notifies any same application program, which is operating as a shared application program on any other terminal, of a state after cancellation or setting.

Embodiment 3

Figure 5:
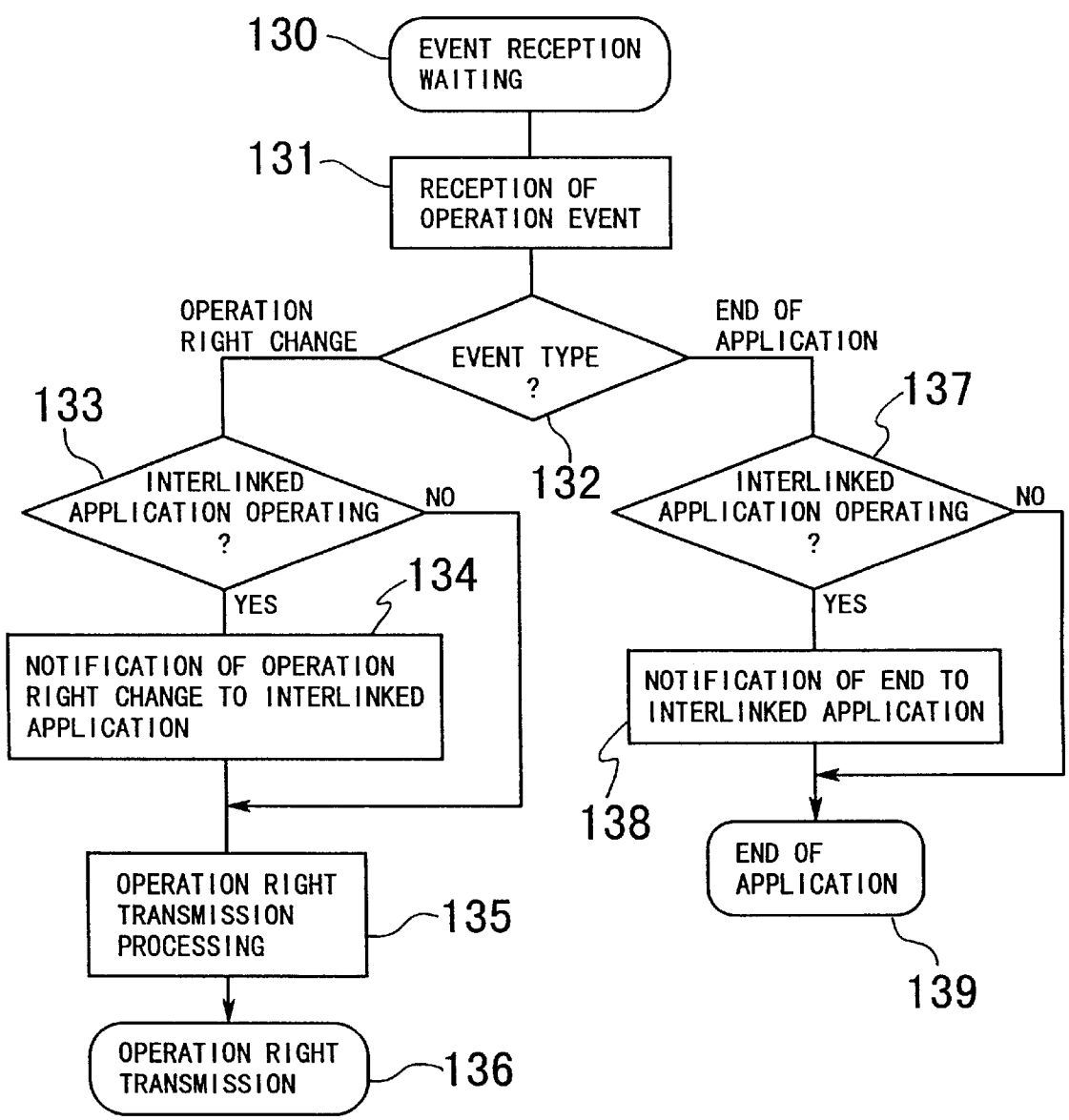
FIGS. 5 and 6 are flow charts illustrating procedures of operation of interlinking and interlinked application programs, respectively, in an operation right interlinking method according to a third preferred embodiment of the present invention.
Figure 6:
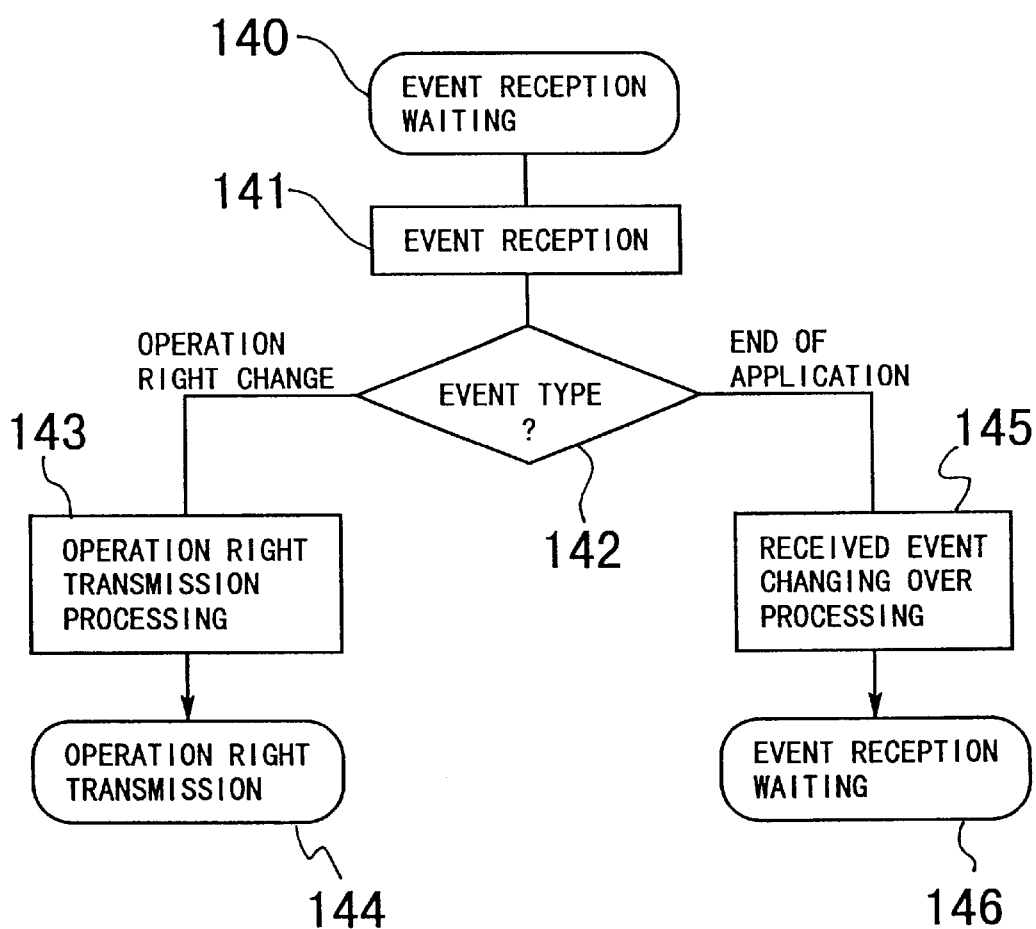

FIGS. 5 and 6 are flow chart illustrating procedures of operation of an operation right interlinking method according to a third preferred embodiment of the present invention. Particularly, FIG. 5 illustrates a procedure of operation of an interlinking application program from among a plurality of application programs present on a same terminal.

Referring to FIG. 5, if the interlinking application program receives an operation event from a user or some other application program (step 131) after it remains in an event reception waiting state (step 130), then it discriminates a type of the received operation event (step 132).

If it is discriminated in step 132 that the received operation event relates to a change of the operation right, the interlinking application program confirms that the interlinked application program is operating (step 133). If it is confirmed that the interlinked application program is operating (when the discrimination in step 133 is YES), then the interlinking application program sends an operation right change notification to the interlinked application program on the same terminal (step 134). On the other hand, if the interlinked application program is not operating (when the discrimination in step 133 is NO), the interlinking application program advances its processing to step 135 skipping step 134.

Then, after the processing in step 134 is ended or the discrimination of NO is made in step 133, operation right transmission processing is performed (step 135) to transmit the operation right of the interlinked application program.

On the other hand, if it is discriminated in step 132 that the received operation event relates to an end of the application, the interlinking application program confirms whether or not the interlinked application program is operating (step 137). If it is confirmed that the interlinked application program is operating (when the discrimination in step 137 is YES), the interlinking application program notifies the interlinked application program on the same terminal of an end of the application (step 138). On the other hand, when the interlinked application program is not operating (when the discrimination in step 137 is NO), the interlinking application program advances its processing to step 139 skipping step 138.

Then, after the processing in step 138 is ended or the discrimination of NO is made in step 137, the interlinking application program is ended (step 139).

FIG. 6 illustrates a procedure of operation on the interlinked application program from within the plurality of shared application programs present on the same terminal.

Referring to FIG. 6, if the interlinked application program receives an event from a user or the other application program (step 141) after it remains in an even reception waiting state (step 140), then it discriminates a type of the received event (step 142). Here, if the interlinking application program is operating, then the interlinked application program receives an operation right change notification event (refer to step 134 of FIG. 5) or an application end notification event (refer to step 138 of FIG. 5) from the interlinking application program on the same terminal.

If it is discriminated in step 142 that the received event relates to an operation right change, then the interlinked application program performs operation right transmission processing in response to the operation right change notification (step 143) to transmit the operation right (step 144).

On the other hand, if it is discriminated in step 142 that the received event relates to an end of the application, the interlinked application program performs changing over processing of the received event (step 145). In the changing over processing of the received event in step 145, the event received in step 141 is changed over so that it originates not from the interlinking application program but is an operation event from a user of the interlinked application program, whereafter it enters an event reception waiting state (step 146). It is to be noted that, if an operation right change notification event is received from a user in this state, then the interlinked application program performs operation right transmission processing in response to the received event as described above (step 143) to transmit the operation right (step 144).

Embodiment 4

Figure 7:
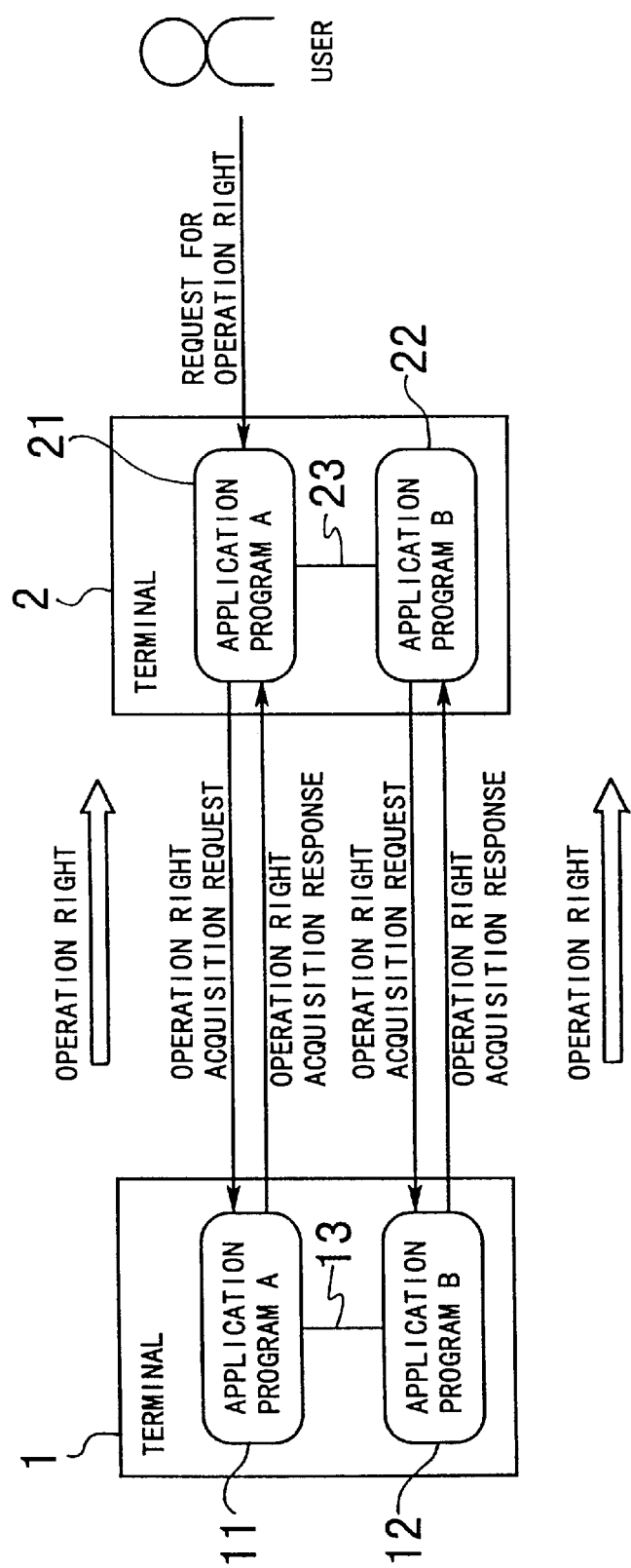
FIGS. 7 and 8 are diagrammatic views illustrating different procedures of operation of a cooperative working method according to a fourth preferred embodiment of the present invention which employ operation right transmission control methods illustrated in FIGS. 15 and 16, respectively.
Figure 8:
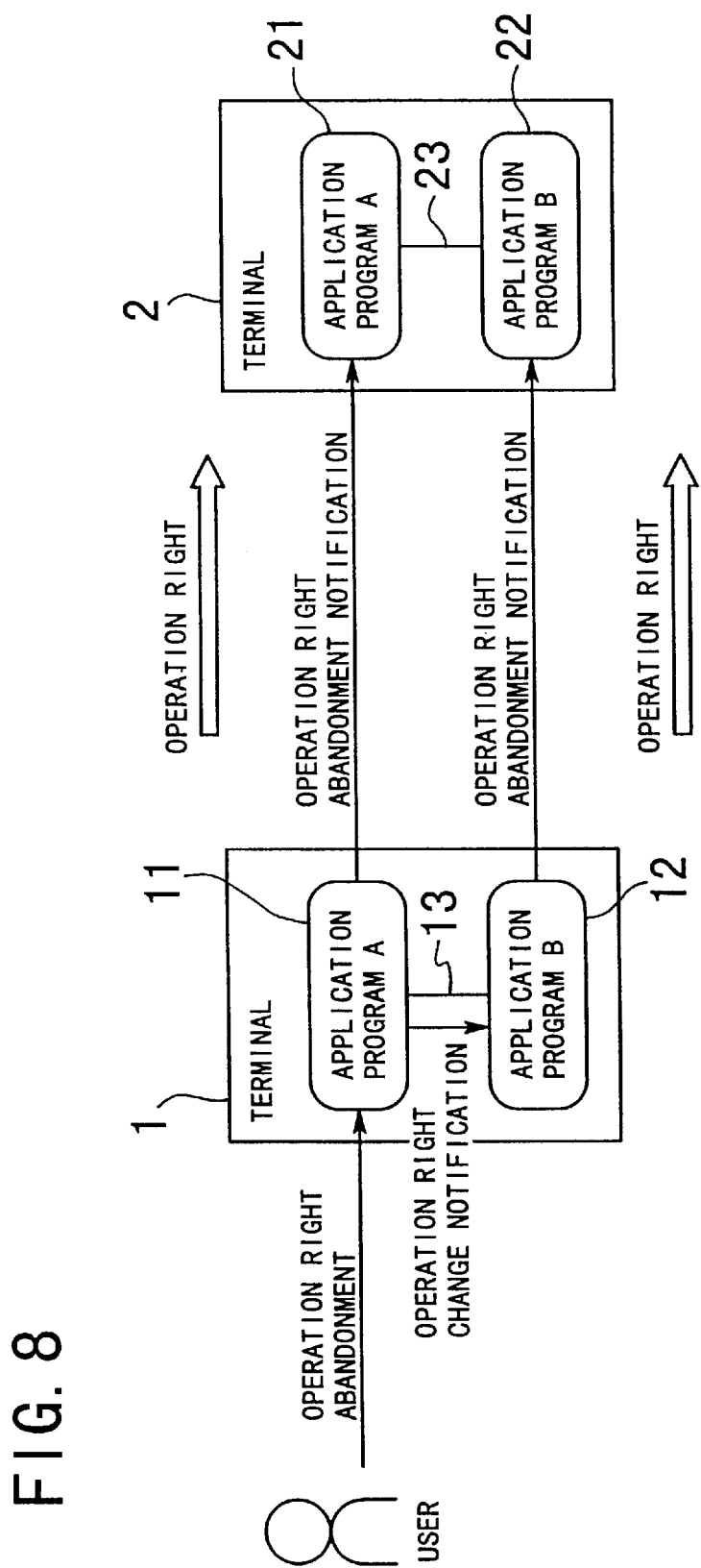

FIGS. 7 and 8 illustrate a cooperative working method according to a fourth preferred embodiment of the present invention. While FIGS. 7 and 8 illustrate cooperative works between two terminals for simplified illustration, the method can naturally be applied similarly even where more than two terminals are involved in such cooperative work. This similarly applies to the fifth to eighth embodiments which will be hereinafter described.

Figure 15:
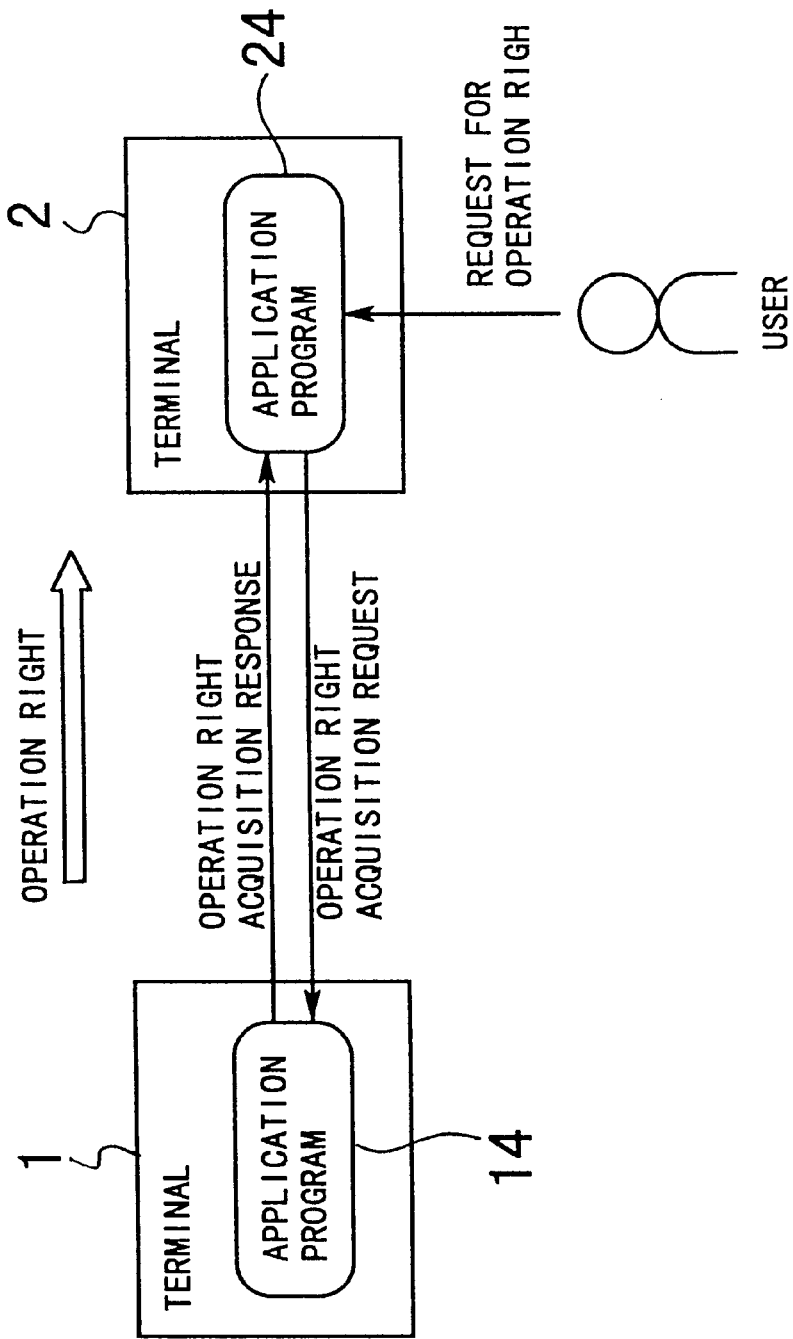
FIG. 15 is a diagrammatic view illustrating an exemplary one of conventional operation right transmission control methods.

FIG. 7 illustrates a procedure of operation of the cooperative working method according to the fourth embodiment of the present invention which employs the operation right transmission control method illustrated in FIG. 15.

Referring to FIG. 7, it is assumed that shared application programs A and B are operating on both of terminals 1 and 2 to perform a cooperative work, and in an initial state, the operation rights of the application programs A and B are set to the application program A 11 and the application program B 12 on the terminal 1, respectively.

If, in this condition, a user of the terminal 2 issues a request for the operation right with the application program A 21, then it is confirmed based on the operation right interlinking method illustrated in FIG. 2 whether or not the interlinked application program is operating.

In the case illustrated in FIG. 7, since the application program B is interlinked with the application program A, the application program A 21 sends an operation right change notification to the application program B 22 via a communication line 23. Simultaneously, the application program A 21 performs operation right transmission processing in accordance with the operation right transmission control method illustrated in FIG. 15 to transmit the operation right from the application program A 11 to the application program A 21. It is to be noted that transmission control of the operation right is such as given in the description of the prior art hereinabove.

On the other hand, also the application program B 22 which receives the operation right change notification from the application program A 21 similarly performs operation right transmission processing in accordance with the operation right transmission control illustrated in FIG. 15 to transmit the operation right from the application program B 12 to the application program B 22.

As the application program A 21 of the terminal 2 issues a request for the operation right in this manner, the operation rights of the application programs A and B are transmitted in an interlinking relationship with each other from the terminal 1 to the respective application programs on the terminal 2.

Figure 16:
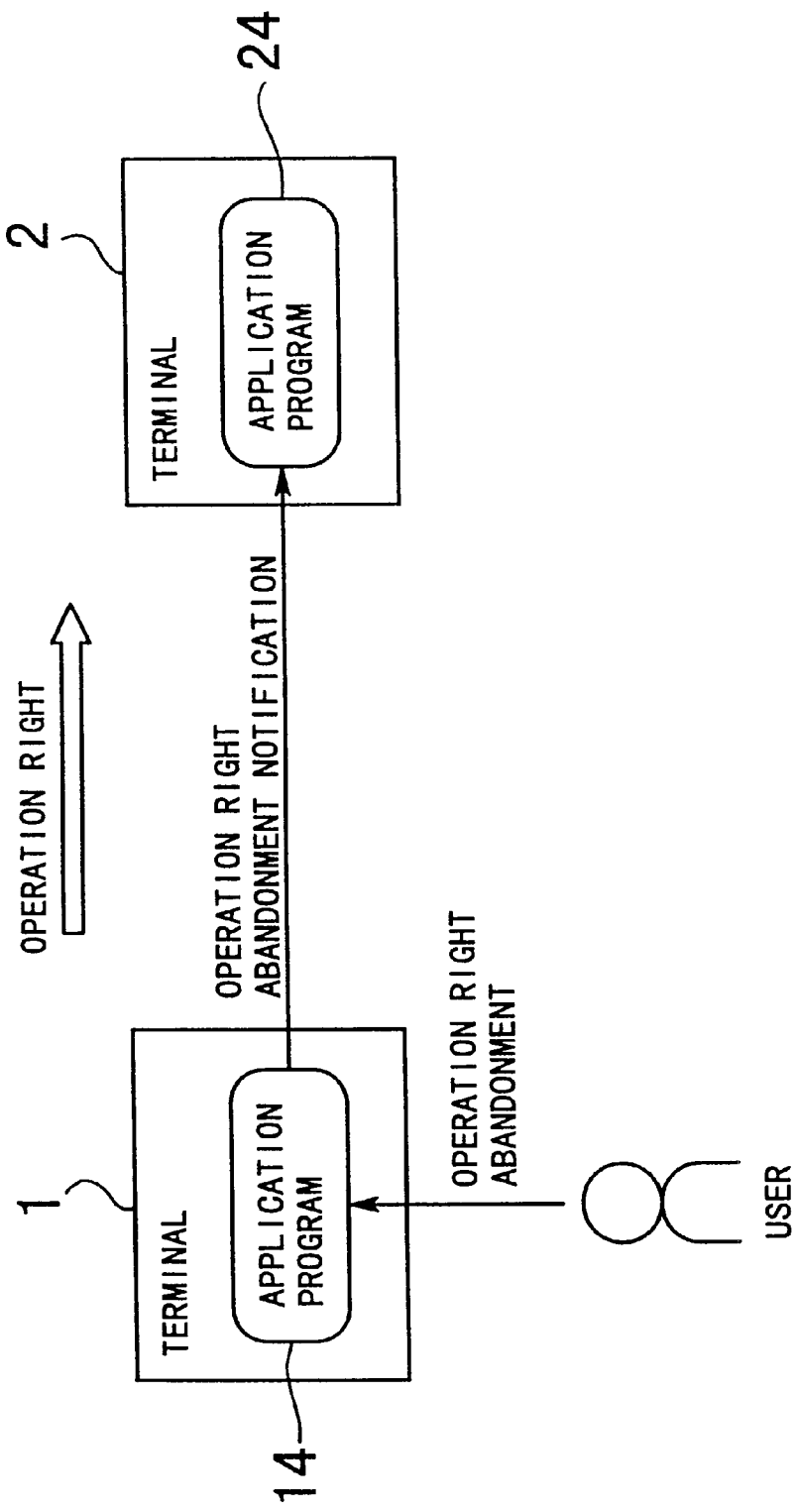
FIG. 16 is a similar view but illustrating another exemplary one of conventional operation right transmission control method.
Figure 17:
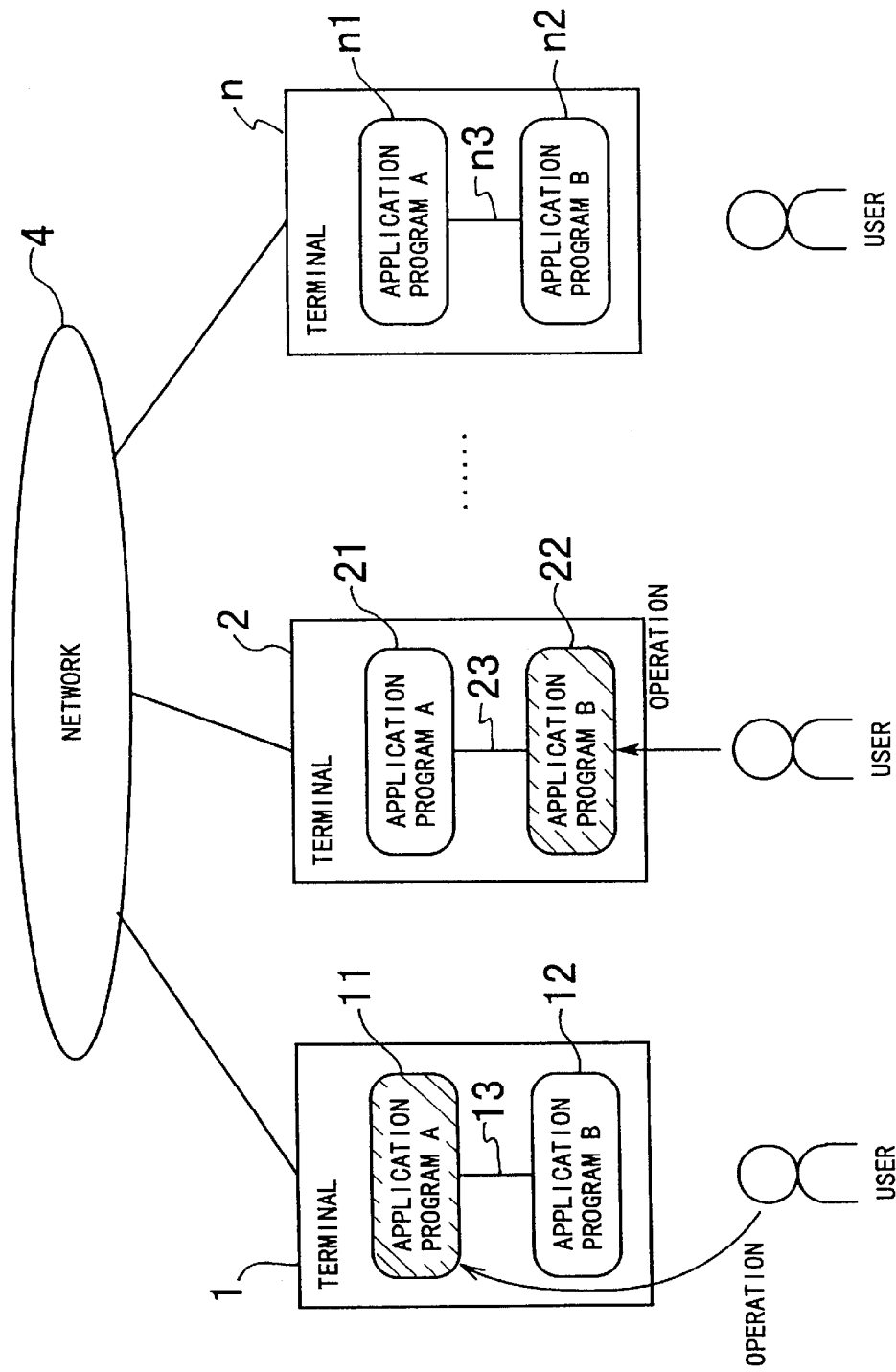
FIG. 17 is a block diagram illustrating a manner in which application programs cooperate with each other using a conventional operation right transmission control method to perform a cooperative operation.

FIG. 8 illustrates another procedure of operation of the cooperative working method according to the fourth embodiment of the present invention which employs the operation right transmission control method illustrated in FIG. 16.

Referring to FIG. 8, it is assumed that shared application programs A and B are operating on both of terminals 1 and 2 to effect a cooperative work, and in an initial state, the operation rights of the application programs A and B are set to the application program A 11 and the application program B 12 on the terminal 1, respectively.

If, in this state, a user of the terminal 1 tries to abandon the operation right of the application program A 11 to transmit the operation right to a user of the terminal 2, then the application program A 11 transmits an operation right change notification to the application program B 12 via another communication line 13 in accordance with the operation right interlinking method illustrated in FIG. 2. Simultaneously, the application program A 11 performs operation right transmission processing in accordance with the operation right transmission control method illustrated in FIG. 16 to transmit the operation right from the application program A 11 to the application program A 21.

On the other hand, also the application program B 12 which receives the operation right change notification from the application program A 11 similarly performs operation right transmission processing in accordance with the operation right transmission control method illustrated in FIG. 16 to transmit the operation right from the application program B 12 to the application program B 22.

As the application program A 11 on the terminal 1 abandons the operation right in this manner, the operation rights of the application program A and the application program B are transmitted in an interlinking relationship with each other from the terminal 1 to the respective corresponding application programs on the terminal 2.

Embodiment 5

Figure 9:
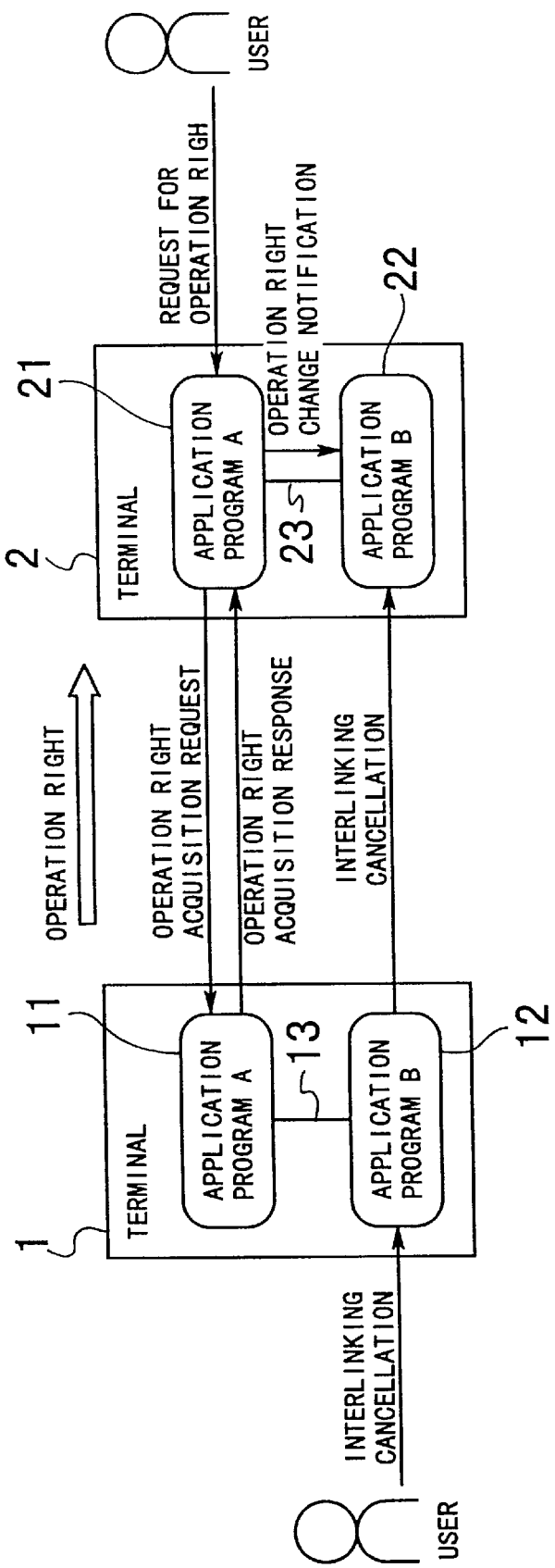
FIGS. 9 and 10 are similar views but illustrating different procedures of operation of a cooperative working method according to a fifth preferred embodiment of the present invention which employ operation right transmission control methods illustrated in FIGS. 15 and 16, respectively.
Figure 10:
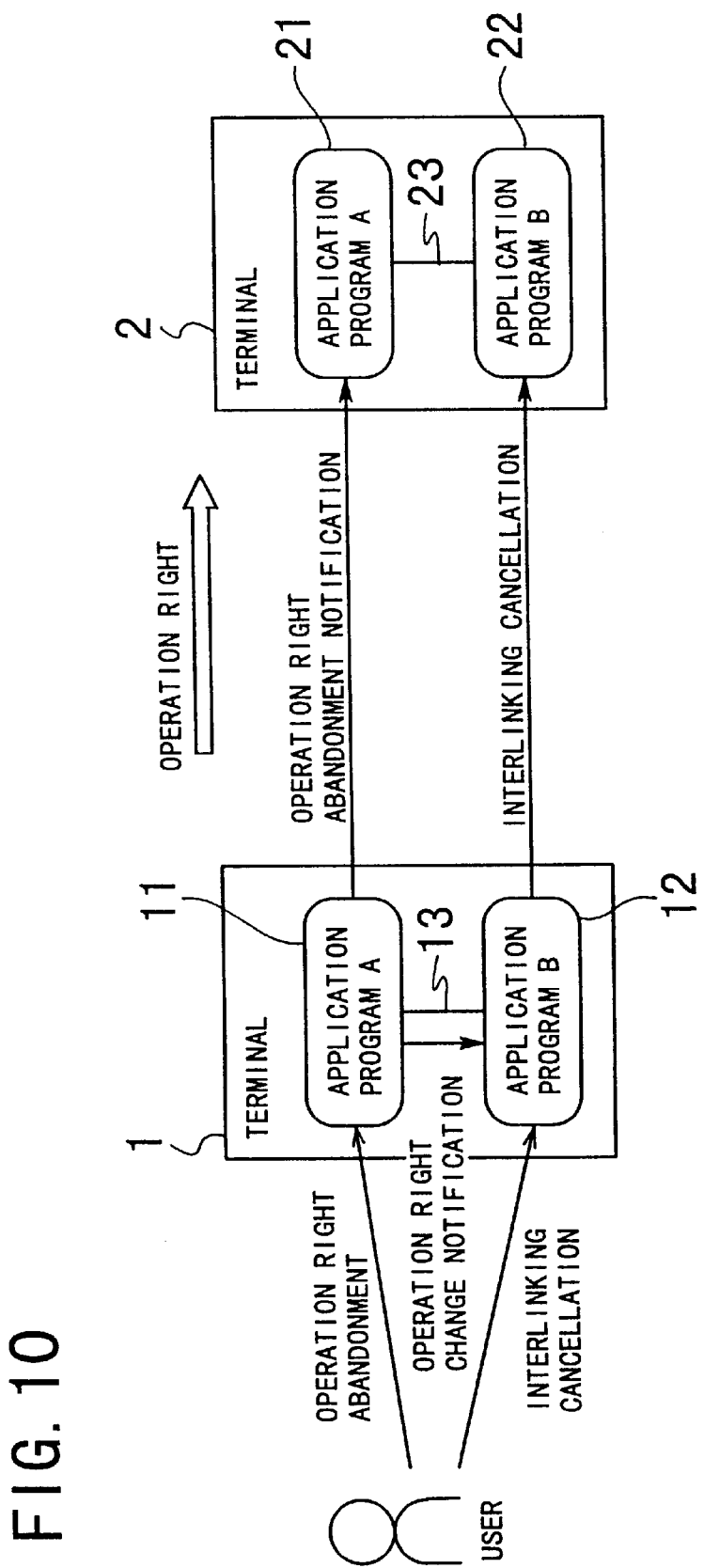

FIGS. 9 and 10 illustrate a cooperative working method according to a fifth preferred embodiment of the present invention. Particularly, FIG. 9 illustrates a procedure of operation of the cooperative working method according to the fifth embodiment of the present invention which employs the operation right transmission control method illustrated in FIG. 15.

Referring to FIG. 9, it is assumed that shared application programs A and B are operating on both of terminals 1 and 2 to effect a cooperative work, and in an initial state, the operation rights of the applications A and B are set on the application program A 11 and the application program B 12 on the terminal 1, respectively.

Here, if a user of the terminal 1 performs an operation for cancellation of interlinking of the operation right of the application program B 12, then an event of interlinking cancellation is sent to the application program B 22 in accordance with the operation right interlinking method illustrated in FIG. 4. Consequently, the application program B 22 knows that interlinking is cancelled.

If, in this state, a user of the terminal 2 delivers a request for the operation right with the application program A 21, then the application program A 21 sends an operation right change notification to the application program B 22 via a communication line 23 in accordance with the operation right interlinking method illustrated in FIG. 2. Simultaneously, the application program A 21 performs operation right transmission processing in accordance with the operation right transmission control method illustrated in FIG. 15 to transmit the operation right from the application program A 11 to the application program A 21.

On the other hand, the application program B 22 which receives the operation right change notification from the application program A 21 does not perform operation right transmission processing since interlinking of the operation right has been cancelled and is inoperative. As a result, the operation right remains on the application program B 12. It is to be noted that, if interlinking is set for the application program B, then the operation right of the application program B is transmitted in an interlinking relationship with the transmission of the operation right of the application program A in a similar manner as in the cooperative working method illustrated in FIG. 7.

FIG. 10 illustrates another procedure of operation of the cooperative working method according to the fifth embodiment of the present invention which employs the operation right transmission control method illustrated in FIG. 16.

Referring to FIG. 10, it is assumed that shared application programs A and B are operating on both terminals 1 and 2 to effect a cooperative work, and in an initial state, the operation rights of the applications A and B are set on the application program A 11 and the application program B 12 on the terminal 1, respectively.

Here, if a user of the terminal 1 performs an operation for cancellation of interlinking of the operation right of the application program B 12, then an event of interlinking cancellation is sent to the application program B 22 in accordance with the operation right interlinking method illustrated in FIG. 4. Consequently, the application program B 22 knows that interlinking is cancelled.

If, in this condition, a user of the terminal 1 abandons the operation right of the application program A 11, then the application program A 11 sends an operation right change notification to the application program B 12 via a communication line 13 in accordance with the operation right interlinking method illustrated in FIG. 2. Simultaneously, the application program A 11 performs operation right transmission processing in accordance with the operation right transmission control method illustrated in FIG. 16 to transmit the operation right from the application program A 11 to the application program A 21.

On the other hand, the application program which receives the operation right change notification from the application program A 11 does not perform operation right transmission processing since interlinking of the operation right has been cancelled. As a result, the operation right remains on the application program B 12. It is to be noted that, if interlinking is set for the application program B, then the operation right of the application program B is transmitted in an interlinking relationship with the transmission of the operation right of the application program A in a similar manner as in the cooperative working method illustrated in FIG. 8.

Embodiment 6

Figure 11:
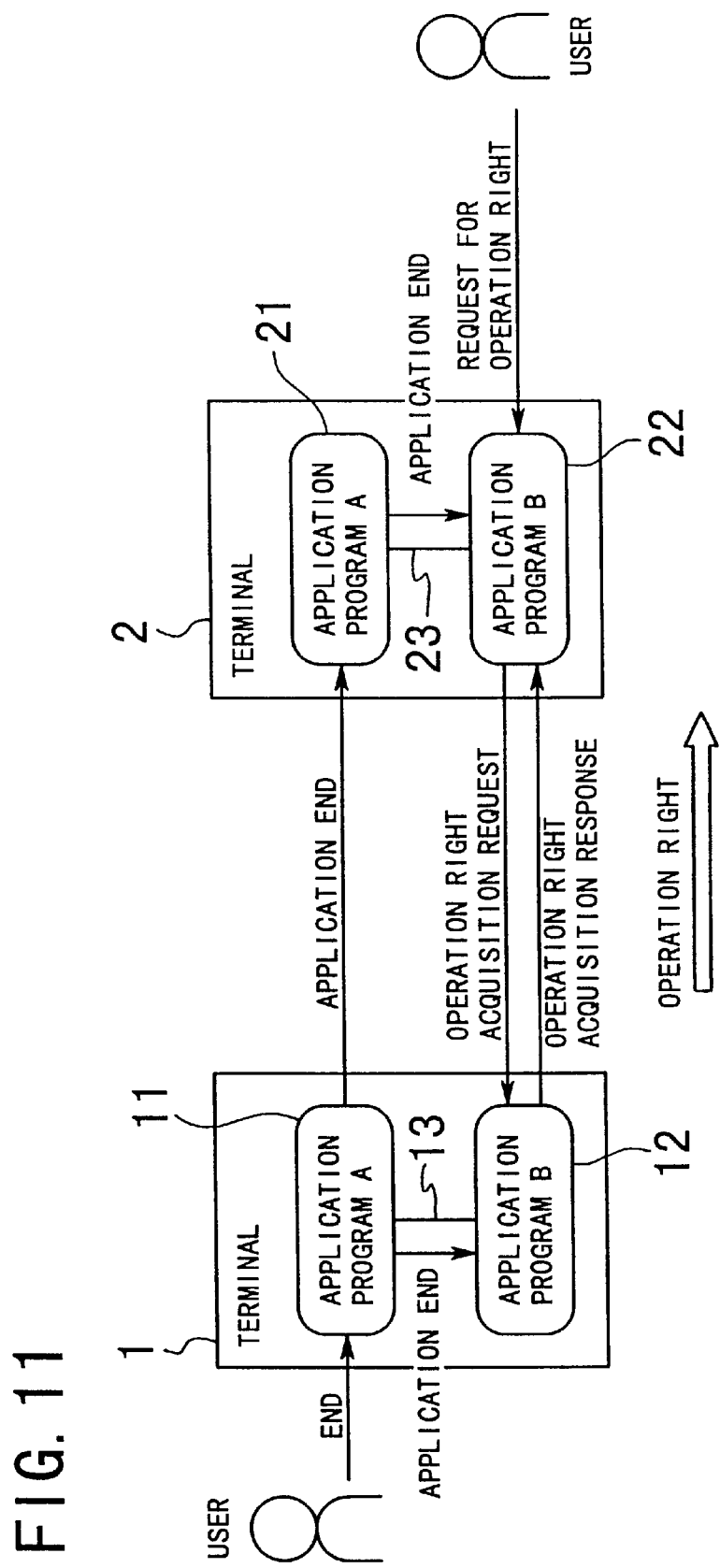
FIGS. 11 and 12 are similar views but illustrating different procedures of operation of a cooperative working method according to a sixth preferred embodiment of the present invention which employ operation right transmission control methods illustrated in FIGS. 15 and 16, respectively.
Figure 12:
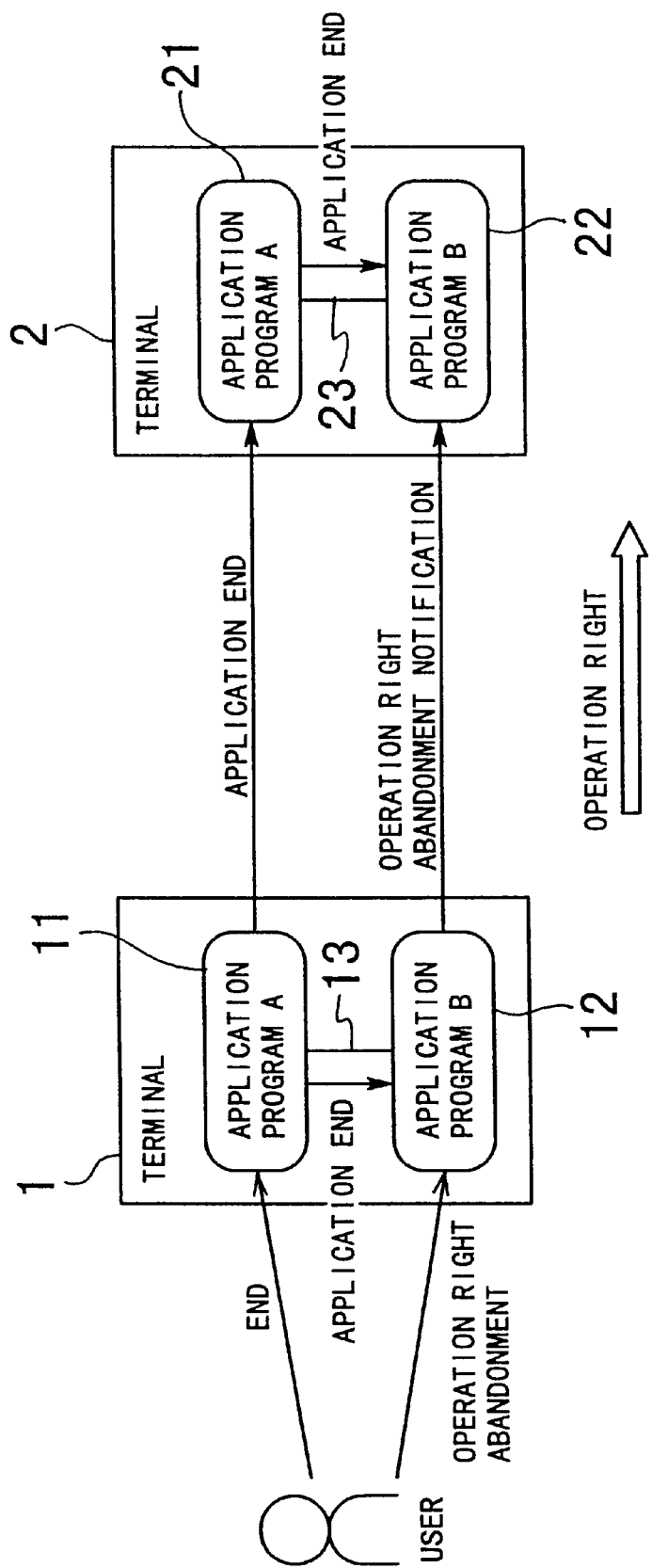

FIGS. 11 and 12 illustrate a cooperative working method according to a sixth preferred embodiment of the present invention. Particularly, FIG. 11 illustrates a procedure of operation of the cooperative working method according to the sixth embodiment of the present invention which employs the operation right transmission control method illustrated in FIG. 15.

Referring to FIG. 11, it is assumed that shared application programs A and B are operating on both of terminals 1 and 2 to effect a cooperative work, and in an initial state, the operation rights of the applications A and B are set on the application program A 11 and the application program B 12 on the terminal 1, respectively.

In the cooperative working method illustrated in FIG. 11, while it is possible to transmit the operation right of the application program B in an interlinking relationship with the transmission of the operation right of the application program A similarly as in the cooperative working method illustrated in FIG. 7, the following operation is performed additionally.

Referring to FIG. 11, if a user of the terminal 1 tries to end the application program A 11, then the application program A 11 sends an end notification of the application to the application program B 12 in accordance with the operation right interlinking method illustrated in FIG. 5. Simultaneously, the application program A 11 sends another end notification of the application to the application A 21 of the terminal 2.

On the other hand, the application program A 21 which receives the end notification of the application from the application program A 11 sends an end notification of the application to the application program B 22.

Then, each of the application programs B 12 and B 22 which receive the end notifications of the application operates so as to allow transmission of the operation right in response to a request from a user. Consequently, if a user of, for example, the terminal 2 issues a request for the operation right of the application program B 22, then the application program B itself performs operation right transmission processing in accordance with the operation right transmission control method illustrated in FIG. 15 to allow transmission of the operation right from the application program B 12 to the application program B 22.

FIG. 12 illustrates a procedure of operation of the cooperative working method according to the sixth embodiment of the present invention which employs the operation right transmission control method illustrated in FIG. 16.

Referring to FIG. 12, if the-application program A is ended, then it becomes possible for the application program B itself to issue a request for the operation right similarly as in the cooperative working method illustrated in FIG. 11. It is to be noted that the transmission of the operation right is performed based on the operation right transmission control method illustrated in FIG. 16 and, if a user of the terminal 1 instructs the application program B 12 for abandonment of the operation right, then the operation right transmission processing is performed so that the operation right is transmitted from the application program B 12 to the application program B 22.

Embodiment 7

Figure 13:
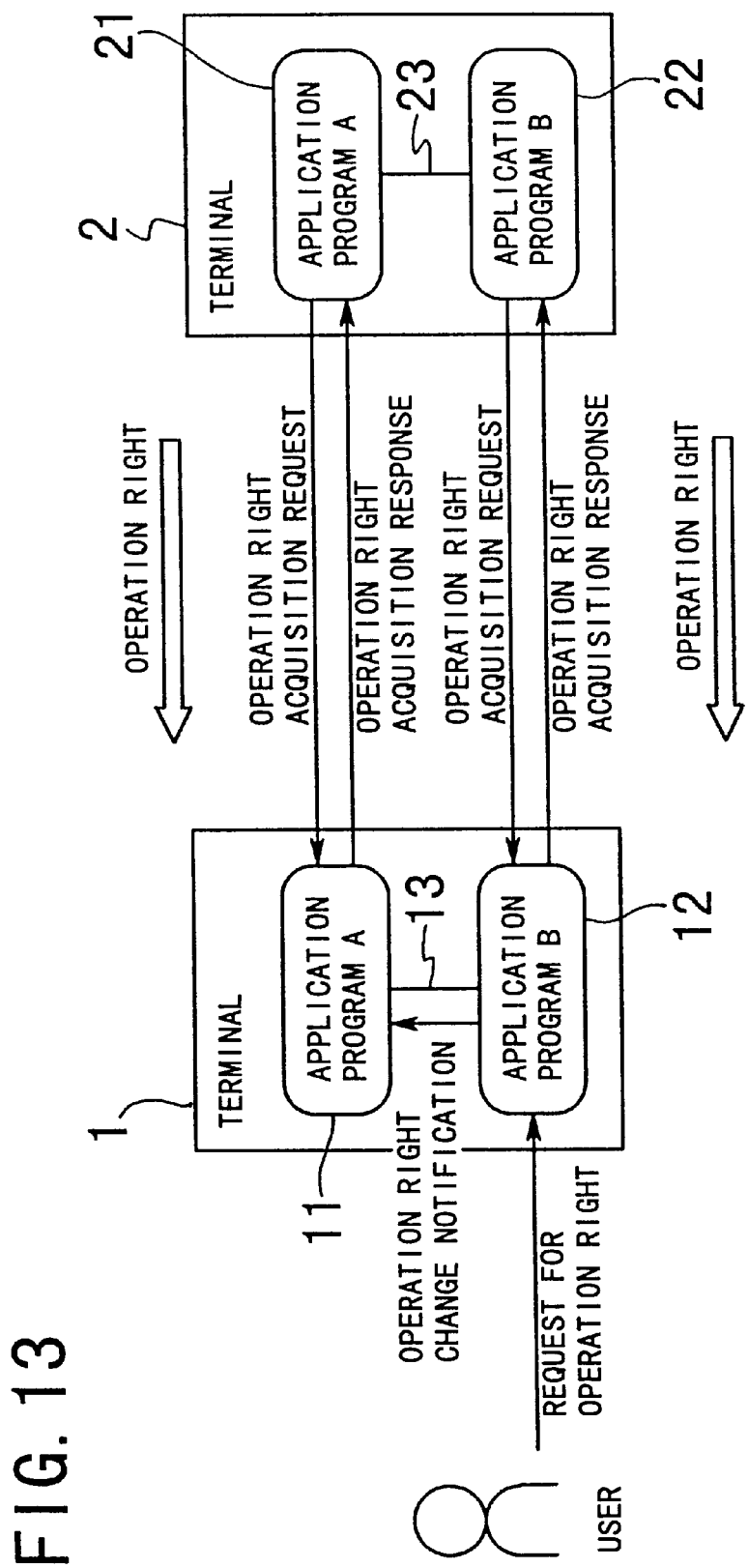
FIG. 13 is a similar view but illustrating a cooperative working method according to a seventh preferred embodiment of the present invention.

FIG. 13 illustrates a procedure of operation of a cooperative working method according to a seventh preferred embodiment of the present invention.

While, in the cooperative working method according to the first embodiment described hereinabove with reference to FIG. 7, the operation right of the application program B is transmitted in an interlinking relationship with transmission of the operation right of the application program A, in the cooperative working method according to the seventh embodiment of the present invention, such interlinking control of an operation right as illustrated in FIG. 13 can be performed in addition to such interlinking control of an operation right as illustrated, for example, in FIG. 7.

Referring to FIG. 13, the cooperative working method according to the seventh embodiment of the present invention has a similar construction to that of the cooperative working method according to the fourth embodiment described hereinabove with reference to FIG. 7, and the operation rights of the application programs A and B are initially set on the application program A 21 and the application program B 22 on the terminal 2, respectively.

If, in this condition, a user of the terminal 1 issues a request for the operation right to the application program B 12, then the application program B 12 transmits an operation right change notification to the application program A 11 via a communication line 13. Simultaneously, the application program B 12 performs operation right transmission processing in accordance with the operation right transmission control method illustrated, for example, in FIG. 15 to acquire the operation right from the application program B 22.

On the other hand, the application program A 11 which receives the operation right change notification from the application program B 12 performs operation right transmission processing similarly as with the application program B to acquire the operation right from the application program A 21.

Since the operation right of the application program A is transmitted in an interlinking relationship with the transmission of the operation right of the application program B in this manner, the application programs A and B can transmit the operation rights in an interlinking relationship with each other (bidirectionally).

Embodiment 8

Figure 14:
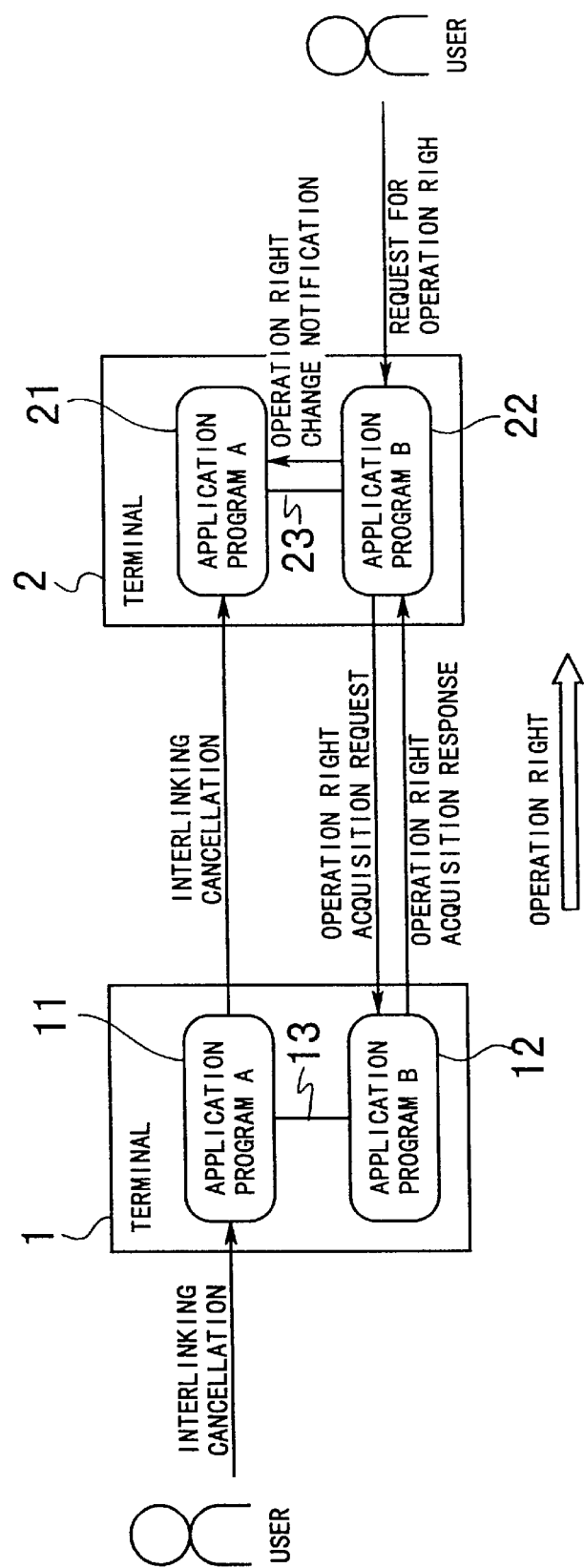
FIG. 14 is a similar view illustrating a cooperative working method according to en eighth preferred embodiment of the present invention.

FIG. 14 illustrates a procedure of operation of a cooperative working method according to an eighth preferred embodiment of the present invention.

While, in the cooperative working method according to the fifth embodiment described hereinabove with reference to FIG. 10, it can be controlled whether or not transmission of the operation right of the application program B should be interlinked with transmission of the operation right of the application program A by selecting setting or cancellation of interlinking of the operation right of the application program B, in the cooperative working method according to the eighth embodiment of the present invention, interlinking control of an operation right illustrated in FIG. 10 is realized for the opposite directions between the application programs A and B.

Referring to FIG. 14, the cooperative working method according to the eighth embodiment of the present invention has a similar construction to that of the cooperative working method according to the fifth embodiment described hereinabove with reference to FIG. 10, and the operation rights of the application programs A and B are initially set on the application program A 11 and the application program B 12 on the terminal 1, respectively.

Here, if the user of the terminal 1 tries to effect cancellation of interlinking of the operation right of the application program A 11, then an event of cancellation of interlinking is sent to the application program A 21. Consequently, the application program A 21 knows that interlinking has been cancelled.

If, in this condition, a user of the terminal 2 issues a request for the operation right with the application program B 22, then an operation right change notification is sent to the application program A 21. Simultaneously, the application program B 22 performs operation right transmission processing in accordance with the operation right transmission control method illustrated, for example, in FIG. 15 to acquire the operation right from the application program B 12.

On the other hand, the application program A 21 which receives the operation right change notification from the application program B 22 does not perform transmission processing of the operation right since interlinking of the operation right has been cancelled. It is to be noted that, if interlinking of the operation right is set for the application program A, then the operation right of the application program A is transmitted in an interlinking relationship with the transmission of the operation right of the application program B.

Having now fully described the invention, it will be apparent to one of ordinary skill in the art that many changes and modifications can be made thereto without departing from the spirit and scope of the invention as set forth herein.

What is claimed is:

1. A cooperative working method for shared application programs in which the shared application programs cooperatively operate among a plurality of terminals to effect a cooperative work, the method comprising:

providing each of the shared application programs with a respective operation right, and reporting operation right transmission information of a first one of the shared application programs to a second one of the shared application programs to control transmission of the operation right of the second shared application program, wherein the operation rights of the first shared application program and the second shared application program are interlinked.

2. The cooperative working method as claimed in claim 1, wherein:

the second shared application program determines whether the operation right of the second shard application program should be transmitted based on the operation right transmission information from the first shared application program.

* * * * *